United States Patent
Li et al.

(10) Patent No.: US 10,255,877 B2
(45) Date of Patent: Apr. 9, 2019

(54) SIGNAL SOURCE DETECTION AND SELECTION SYSTEM, ELECTRONIC SYSTEM HAVING THE SAME, AND METHOD OF DETECTING AND SELECTING A SIGNAL SOURCE FOR A DISPLAY APPARATUS

(71) Applicant: BOE TECHNOLOGY GROUP CO., LTD., Beijing (CN)

(72) Inventors: Xiaoyu Li, Beijing (CN); Lihua Geng, Beijing (CN); Navarrete Michelini Pablo, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 131 days.

(21) Appl. No.: 15/528,584

(22) PCT Filed: Aug. 22, 2016

(86) PCT No.: PCT/CN2016/096161
§ 371 (c)(1),
(2) Date: May 22, 2017

(87) PCT Pub. No.: WO2017/185570
PCT Pub. Date: Nov. 2, 2017

(65) Prior Publication Data
US 2018/0190237 A1    Jul. 5, 2018

(30) Foreign Application Priority Data
Apr. 25, 2016 (CN) .......................... 2016 1 0262597

(51) Int. Cl.
*G06F 3/14* (2006.01)
*G09G 5/00* (2006.01)

(52) U.S. Cl.
CPC ........... *G09G 5/006* (2013.01); *G06F 3/1423* (2013.01); *G09G 5/00* (2013.01); *G09G 2370/10* (2013.01);
(Continued)

(58) Field of Classification Search
CPC .......... G06F 3/14; G06F 13/40; G06F 3/1423; G09G 5/00; G09G 2370/10; G09G 2370/12; G09G 2370/22
See application file for complete search history.

(56) References Cited

U.S. PATENT DOCUMENTS

| | | | |
|---|---|---|---|
| 2007/0153132 | A1 | 7/2007 | Jong |
| 2015/0006872 | A1* | 1/2015 | Sonobe ................. G06F 9/4401 713/2 |
| 2015/0043888 | A1* | 2/2015 | Bozarth ................. H04N 5/268 386/231 |

FOREIGN PATENT DOCUMENTS

| | | |
|---|---|---|
| CN | 1642248 A | 7/2005 |
| CN | 1829279 A | 9/2006 |

(Continued)

OTHER PUBLICATIONS

International Search Report & Written Opinion dated Jan. 24, 2017 regarding PCT/CN2016/096161.

*Primary Examiner* — Henry Tsai
*Assistant Examiner* — Christopher Daley
(74) *Attorney, Agent, or Firm* — Intellectual Valley Law, P.C.

(57) ABSTRACT

The present application discloses a signal source detection and selection system for detecting and selecting a signal source for a display apparatus having a plurality of signal input interfaces configured to receive a plurality of input signals from a plurality of signal sources. The signal source detection and selection system includes an input interface scanner, an interface selector, a signal processor, and an (Continued)

output terminal. The input interface scanner is configured to scan each of the plurality of signal input interfaces and determine whether at least one signal input interfaces receives input signals. The interface selector, coupled to the input interface detector, is configured to select a signal input interface as a selected signal input interface, and gate an input signal from the selected signal input interface to the signal processor. The signal processor, coupled to the input interface selector, is configured to process the input signal from the selected signal input interface to generate a processed signal. The output terminal is configured to output the processed signal.

20 Claims, 7 Drawing Sheets

(52) U.S. Cl.
CPC ..... *G09G 2370/12* (2013.01); *G09G 2370/22* (2013.01)

(56) References Cited

FOREIGN PATENT DOCUMENTS

| CN | 1997135 A | 7/2007 |
|---|---|---|
| CN | 101419792 A | 4/2009 |
| CN | 103281590 A | 9/2013 |
| CN | 105516776 A | 4/2016 |

* cited by examiner

SIGNAL SOURCE DETECTION AND SELECTION SYSTEM, ELECTRONIC SYSTEM HAVING THE SAME, AND METHOD OF DETECTING AND SELECTING A SIGNAL SOURCE FOR A DISPLAY APPARATUS

CROSS-REFERENCE TO RELATED APPLICATION

This application is a national stage application under 35 U.S.C. § 371 of International Application No. PCT/CN2016/096161 filed Aug. 22, 2016, which claims priority to Chinese Patent Application No. 201610262597.6, filed Apr. 25, 2016, the contents of which are incorporated by reference in the entirety.

TECHNICAL FIELD

The present invention relates to display technology, more particularly, to a signal source detection and selection system, an electronic system having the same, and a method of detecting and selecting a signal source for a display apparatus.

BACKGROUND

Conventional display apparatuses typically have multiple signal input interfaces of various types. Often, they also include multiple signal input interfaces of a same type. When multiple signal input interfaces in a conventional display apparatus receive input signals from multiple signal sources simultaneously, it is required for a user to manually select a desired signal input interface for broadcasting. This results in inconvenient use and poor user experience.

SUMMARY

In one aspect, the present invention provides a signal source detection and selection system for detecting and selecting a signal source for a display apparatus having a plurality of signal input interfaces configured to receive a plurality of input signals from a plurality of signal sources, comprising an input interface scanner, an interface selector, a signal processor, and an output terminal, wherein the input interface scanner is configured to scan each of the plurality of signal input interfaces and determine whether at least one signal input interfaces receives input signals; the interface selector, coupled to the input interface detector, is configured to select a signal input interface as a selected signal input interface, and gate an input signal from the selected signal input interface to the signal processor; the signal processor, coupled to the input interface selector, is configured to process the input signal from the selected signal input interface to generate a processed signal; and the output terminal is configured to output the processed signal.

Optionally, at least two signal input interfaces receive input signals; the interface selector is configured to select a signal input interface having a highest priority according to a priority table out of the at least two signal input interfaces as the selected signal input interface, the priority table ranking the plurality signal input interfaces by priority; and gate an input signal from the selected signal input interface to the signal processor.

Optionally, the interface selector comprises a priority setter for adjusting priority associated with the plurality signal input interfaces in the priority table.

Optionally, the signal source detection and selection system further comprises an input interface coupled to the priority setter, the input interface being configured to receive a priority adjustment information from a user; wherein the priority setter is configured to adjust priority associated with the plurality signal input interfaces in the priority table upon receiving the priority adjustment information from the input interface.

Optionally, the interface selector further comprises a statistic analyzer configured to collect usage condition information of the plurality signal input interfaces and generate usage condition statistic based on the usage condition information; the priority setter is configured to adjust priority associated with the plurality signal input interfaces in the priority table based on the usage condition statistic.

Optionally, the usage condition information comprises at least one of an accumulated number of uses in a time period and an accumulated usage duration in the time period.

Optionally, the statistic analyzer comprises a timer and a plurality of accumulators, each of the plurality of accumulators corresponding to each of the plurality of signal input interfaces; each of the plurality of accumulators is configured to accumulate a number of uses in the time period; and the timer is configured to determine whether the time period has lapsed; and transmit a signal to the priority setter when the time period has lapsed to adjust the priority associated with the plurality signal input interfaces in the priority table according to the accumulated number of uses corresponding to each of the plurality of signal input interfaces in a lapsed time period.

Optionally, the interface selector further comprises a counter, a selector, and a gate; the counter is configured to calculate a total number of signal input interfaces receiving input signals; the selector is configured to select a signal input interface as the selected signal input interface; and the gate is configured to gate the input signal from the selected signal input interface to the signal processor.

Optionally, only one signal input interface receives input signals, the selector is configured to select the only one signal input interface as the selected signal input interface.

Optionally, the total number of signal input interfaces receiving input signals are at least two, the selector is configured to select a signal input interface having a highest priority according to a priority table out of the at least two signal input interfaces as the selected signal input interface.

Optionally, the signal processor comprises a first signal sub-processor and a second signal sub-processor; the first signal sub-processor is configured to execute a protocol converting process to convert the input signal from the selected signal input interface to a converted signal; and the second signal sub-processor is configured to execute a scan format converting process on the converted signal.

In another aspect, the present invention provides a method of detecting and selecting a signal source for a display apparatus having a plurality of signal input interfaces configured to receive a plurality of input signals from a plurality of signal sources, comprising scanning each of the plurality of signal input interfaces and determining whether at least one signal input interfaces receives input signals; selecting a signal input interface as a selected signal input interface; processing an input signal from the selected signal input interface to generate a processed signal; and outputting the processed signal to the display apparatus for broadcasting.

Optionally, at least two signal input interfaces are determined to receive input signals; the step of selecting comprises selecting a signal input interface having a highest priority according to a priority table out of the at least two signal input interfaces as the selected signal input interface, the priority table ranks the plurality signal input interfaces by priority.

Optionally, the step of selecting further comprises adjusting priority associated with the plurality signal input interfaces in the priority table.

Optionally, the step of selecting further comprises receiving priority adjustment information from a user, and the step of adjusting priority associated with the plurality signal input interfaces in the priority table comprises adjusting priority associated with the plurality signal input interfaces in the priority table upon receiving the priority adjustment information.

Optionally, the step of selecting further comprises collecting a usage condition information of the plurality signal input interfaces and generating usage condition statistic based on the usage condition information; and the step of adjusting priority associated with the plurality signal input interfaces in the priority table comprises adjusting priority associated with the plurality signal input interfaces in the priority table based on the usage condition statistic.

Optionally, the usage condition information comprises at least one of an accumulated number of uses in a time period and an accumulated usage duration in the time period.

Optionally, the step of collecting usage condition information of the plurality signal input interfaces and generating usage condition statistic based on the usage condition information comprises accumulating a number of uses of each of the plurality of signal input interfaces in the time period; and the step of adjusting priority associated with the plurality signal input interfaces in the priority table comprises, when the time period has lapsed, adjusting the priority associated with the plurality signal input interfaces in the priority table according to the accumulated number of uses of each of the plurality of signal input interfaces in a lapsed time period.

Optionally, the method further comprises detecting whether a new signal source is coupled to the display apparatus; determining whether a signal input interface corresponding to the new signal source has a priority higher than that associated with the selected signal input interface; when the signal input interface corresponding to the new signal source has a priority higher than that associated with the currently selected signal input interface; gating the input signal from the new signal source to the signal processor and in turn to the output interface for broadcasting, when the signal input interface corresponding to the new signal source has a priority lower than that associated with the currently selected signal input interface; requesting user instruction on whether to switch to the signal input interface corresponding to the new signal source; and upon receiving user instruction to switch to the signal input interface corresponding to the new signal source, switching the priority setting associated with the signal input interface corresponding to the new signal source with that associated with the selected signal input interface; selecting the signal input interface corresponding to the new signal source for broadcasting on the display apparatus.

Optionally, the method further comprises when it is determined that only one signal input interface receives input signals, an input signal from the only one signal input interface is selected as the selected signal input interface; and when it is determined that at least two signal input interfaces receive input signals, selecting a signal input interface having a highest priority according to a priority table out of the at least two signal input interfaces as the selected signal input interface, the priority table ranks the plurality signal input interfaces by priority.

Optionally, the method further comprises adding one to a number of uses of the selected signal input interface in the time period; determining whether the time period has lapsed subsequent to the adding step; and when the time period has lapsed, setting the signal input interface having a maximum accumulator value as the signal input interface having the highest priority; resetting the time period and restarting the accumulating step.

Optionally, the step of processing an input signal from the selected signal input interface to generate a processed signal comprises executing a protocol converting process to convert the input signal from the selected signal input interface to a converted signal; and executing a scan format converting process on the converted signal.

In another aspect, the present invention provides an electronic system comprising a display apparatus having a plurality of signal input interfaces configured to receive a plurality of input signals from a plurality of signal sources; a memory; and a processor, coupled to the memory, is configured to execute instructions comprising scanning each of the plurality of signal input interfaces and determining whether at least one signal input interfaces receive input signals; selecting a signal input interface as a selected signal input interface; processing an input signal from the selected signal input interface to generate a processed signal; and outputting the processed signal.

Optionally, selecting the signal input interface comprises selecting a signal input interface having a highest priority according to a priority table out of the at least two signal input interfaces as the selected signal input interface, the priority table ranks the plurality signal input interfaces by priority.

Optionally, the electronic system further comprises a plurality of decoding chips, each of the plurality of decoding chips corresponding to each of the plurality of signal input interfaces; wherein scanning each of the plurality of signal input interfaces comprises scanning a plug signal from each of the plurality of decoding chips corresponding to each of the plurality of signal input interfaces.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now describe more specifically with reference to the following embodiments. It is to be noted that the following descriptions of some embodiments are presented herein for purpose of illustration and description only. It is not intended to be exhaustive or to be limited to the precise form disclosed.

The present disclosure provides a signal source detection and selection system, an electronic system having the same, and a method of detecting and selecting a signal source for a display apparatus that substantially obviate one or more of the problems due to limitations and disadvantages of the related art.

Figure 1:
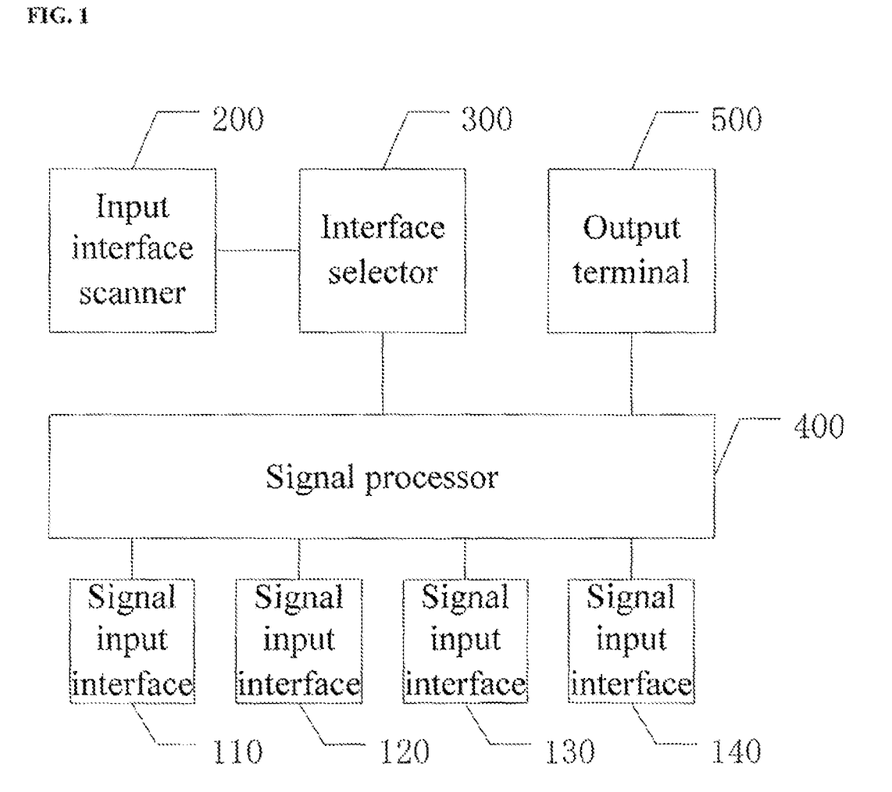
FIG. 1 is a diagram illustrating the structure of a signal source detection and selection system in some embodiments.

FIG. 1 is a diagram illustrating the structure of a signal source detection and selection system in some embodiments. The signal source detection and selection system is coupled with a display apparatus having a plurality of signal input interfaces configured to receive a plurality of input signals from a plurality of signal sources, and to detect and select a signal source for broadcasting in the display apparatus. Referring to FIG. 1, the display apparatus has a plurality of signal input interfaces, including a signal input interface 110, a signal input interface 120, a signal input interface 130, and a signal input interface 140. The signal source detection and selection system in the embodiment also includes an input interface scanner 200, an interface selector 300, a signal processor 400, and an output terminal 500.

The input interface scanner 200 is configured to scan each of the plurality of signal input interfaces and to determine whether at least one signal input interface receives input signals. The interface selector 300 is configured to select a signal input interface as a selected signal input interface. The interface selector 300 is further configured to gate an input signal from the selected signal input interface to the signal processor 400. The signal processor 400 is configured to process the input signal from the selected signal input interface to generate a processed signal. The output terminal 500 is configured to output the processed signal for broadcasting in the display apparatus.

When it is determined at least two signal input interfaces receive input signals, the interface selector 300 is configured to select a signal input interface having a highest priority according to a priority table out of the at least two signal input interfaces as a selected signal input interface. The priority table ranks the plurality signal input interfaces by priority. The interface selector 300 is further configured to gate an input signal from the selected signal input interface to the signal processor 400. The signal processor 400 is configured to process the input signal from the selected signal input interface to generate a processed signal. The output terminal 500 is configured to output the processed signal for broadcasting in the display apparatus.

Optionally, when there is only one signal input interface receives an input signal, the only one signal input interface is selected as the selected signal input interface. The input signal received by the only one signal input interface is gated to the signal processor 400 for generating a processed signal. The processed signal is outputted through the output signal for broadcasting in the display apparatus.

The present signal source detection and selection system is a priority broadcasting system that is capable of automatically selecting a signal input interface having a highest priority as the selected signal input interface for priority broadcasting. The present system obviates the need for manually selecting a signal input interface for broadcasting, greatly enhancing convenience and user experience.

In some embodiments, the plurality of signal input interfaces are signal input interfaces of a same type. In some embodiments, the plurality of signal input interfaces includes signal input interfaces of different type, e.g., a DVI interface, a HDMI interface, and a VGA interface.

Optionally, the signal source detection and selection system is coupled to a single display apparatus. Optionally, the signal source detection and selection system is coupled to a plurality of display apparatuses. Optionally, the plurality of signal input interfaces of a same type are from a single display apparatus. Optionally, the plurality of signal input interfaces of a same type are from a plurality of display apparatuses.

Various appropriate methods may be employed to scan each of the plurality of signal input interfaces and to determine whether any signal input interface receives an input signal. In some embodiments, a decoding chip may be mounted to each of the plurality of signal input interfaces. The input interface scanner 200 is configured to scan a plug signal from each of the plurality of signal input interfaces and to determine whether it receives an input signal. For example, a DVI decoding chip may be mounted to a DVI interface, a HDMI decoding chip may be mounted to a HDMI interface.

Figure 2:
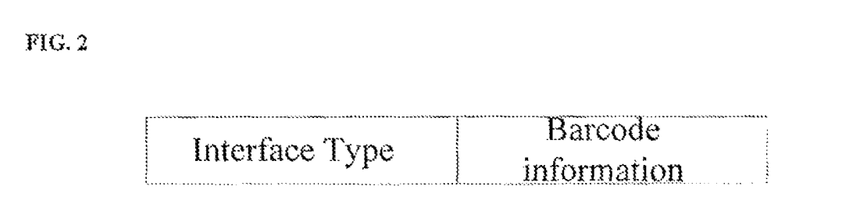
FIG. 2 is a diagram illustrating a data packet transmitted by an input interface scanner in some embodiments.

When it is detected that the display apparatus receives input signals from signal sources, the input interface scanner transmits the detected input signals to the interface selector, e.g., in a form of a data packet. FIG. 2 is a diagram illustrating a data packet transmitted by an input interface scanner in some embodiments. Referring to FIG. 2, the data packet transmitted from the input interface scanner to the interface selector may include information regarding interface type of each signal input interface and corresponding barcode information for each signal input interface. Upon receiving the information contained in the data packet, the interface selector determines whether there are at least two signal input interfaces receiving input signals. In some embodiments, when only one single signal input interface receives an input signal, the input signal from the single signal input interface is gated to output terminal. In some embodiments, when there are at least two signal input interfaces receiving input signals, the interface selector selects a signal input interface having a highest priority (e.g., according to a priority table) out of the at least two signal input interfaces as a selected signal input interface. Subsequently, the interface selector in communication with the signal processor gates the input signal from the selected signal input interface to the signal processor. The signal processor processes the input signal from the selected signal input interface, and generates a processed signal. The processed signal is then outputted to the display apparatus through the output terminal. Optionally, the signal processor includes a first signal sub-processor and a second signal sub-processor.

In some embodiments, the first signal sub-processor is configured to execute a protocol converting process to convert the input signal from the selected signal input interface to a converted signal. For example, the first signal sub-processor is capable of converting input signals from various types of signal input interfaces into a unified format by the protocol converting process. Optionally, the first signal sub-processor includes a plurality of format converters corresponding to a plurality of signal input interface types, respectively, for converting input signals using the protocol converting process. For example, the first signal sub-processor may include a DVI format converter corresponding to a DVI interface, and a HDMI format converter corresponding to a HDMI interface. When an input signal from the selected signal input interface is gated from the interface selector to the first signal sub-processor, the first signal sub-processor first detected the information regarding interface type of the selected signal input interface contained in the data packet. Based on the detected interface type, a corresponding format converter is selected for converting the input signal into a unified format using the protocol converting process.

In some embodiments, the second signal sub-processor is configured to further convert the signal in the unified format using a scan format converting process. For example, the second signal sub-processor is capable of further processing the signal from the first signal sub-processor into a format that meets timing requirement of the display apparatus.

In some embodiments, the signal source detection and selection system further includes a priority setter for adjusting priority associated with the plurality signal input interfaces in the priority table, e.g., to accommodate various user needs.

Figure 3:
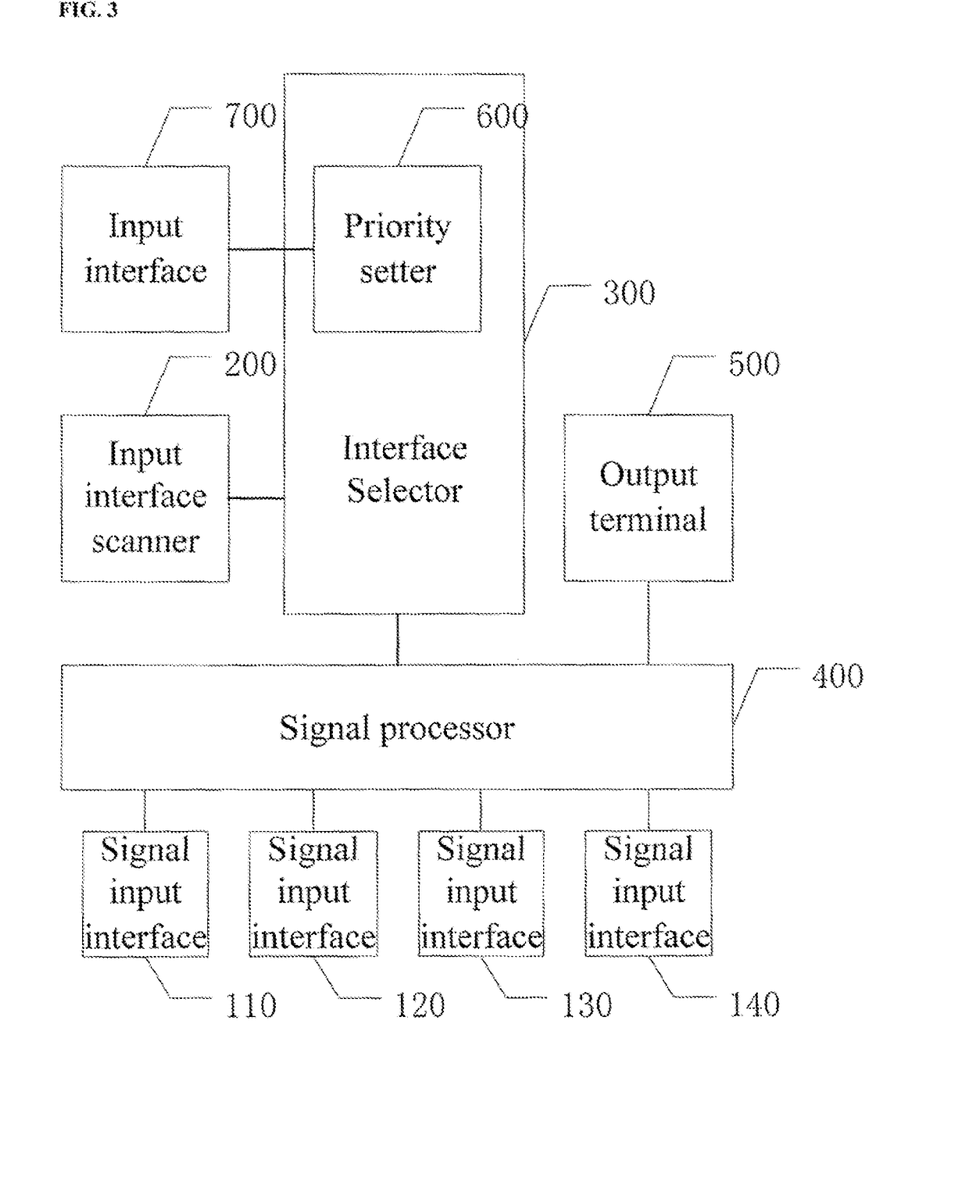
FIG. 3 is a diagram illustrating the structure of a signal source detection and selection system in some embodiments.

In some embodiments, the priority associated with the plurality signal input interfaces may be adjusted based on priority adjustment information inputted by a user. FIG. 3 is a diagram illustrating the structure of a signal source detection and selection system in some embodiments. The signal source detection and selection system is coupled with a display apparatus having a plurality of signal input interfaces configured to receive a plurality of input signals from a plurality of signal sources, and to detect and select a signal source for the display apparatus. Referring to FIG. 3, the display apparatus has a plurality of signal input interfaces, including a signal input interface 110, a signal input interface 120, a signal input interface 130, and a signal input interface 140. The signal source detection and selection system in the embodiment includes an input interface scanner 200, an interface selector 300, a signal processor 400, an output terminal 500, and an input interface 700. The interface selector 300 includes a priority setter 600.

The input interface scanner 200 is configured to scan each of the plurality of signal input interfaces and to determine whether at least two signal input interfaces receive input signals. The interface selector 300 is configured to select a signal input interface having a highest priority according to a priority table out of the at least two signal input interfaces as a selected signal input interface. The priority table ranks the plurality signal input interfaces by priority. The interface selector 300 is also configured to gate an input signal from the selected signal input interface to the signal processor 400. The signal processor 400 is configured to process the input signal from the selected signal input interface to generate a processed signal. The output terminal 500 is configured to output the processed signal to the display apparatus for image display. The priority setter 600 is configured to adjust priority associated with each of the plurality signal input interfaces in the priority table. The input interface 700 is configured to receive priority adjustment information from a user. The priority setter 600 adjusts priority associated with the plurality signal input interfaces in the priority table upon receiving the priority adjustment information.

Optionally, the input interface 700 is integrated on an operation interface of a system-on-chip (SOC) module of the display apparatus. The SOC module is in communication with the priority setter through an I2C bus.

In some embodiments, a user may pre-set priority associated with each of the plurality signal input interfaces in the priority table using the input interface 700, e.g., in an initial use of the signal source detection and selection system (or an initial use of the display apparatus). When the display apparatus is powering up, the input interface scanner polls each signal input interface of the display apparatus. Optionally, when only one single signal input interface is detected to receive an input signal (e.g., connected to a signal source), information regarding interface type of the single signal input interface and corresponding barcode information are transmitted to the interface selector. The input signal from the single signal input interface is gated from the interface selector to the signal processor.

Optionally, when there are at least two signal input interfaces receiving input signals, the input interface scanner transmits information regarding interface type of each signal input interface and corresponding barcode information to the interface selector. The interface selector selects a signal input interface having a highest priority according to a priority table out of the at least two signal input interfaces as a selected signal input interface. The input signal from the selected signal input interface is then gated from the interface selector to the signal processor. Upon receiving the input signal, the signal processor processes the input signal, e.g., using a protocol converting process or a scan format converting process, and generates a processed signal. The processed signal is then outputted through the output terminal to the display apparatus for broadcasting.

Figure 4:
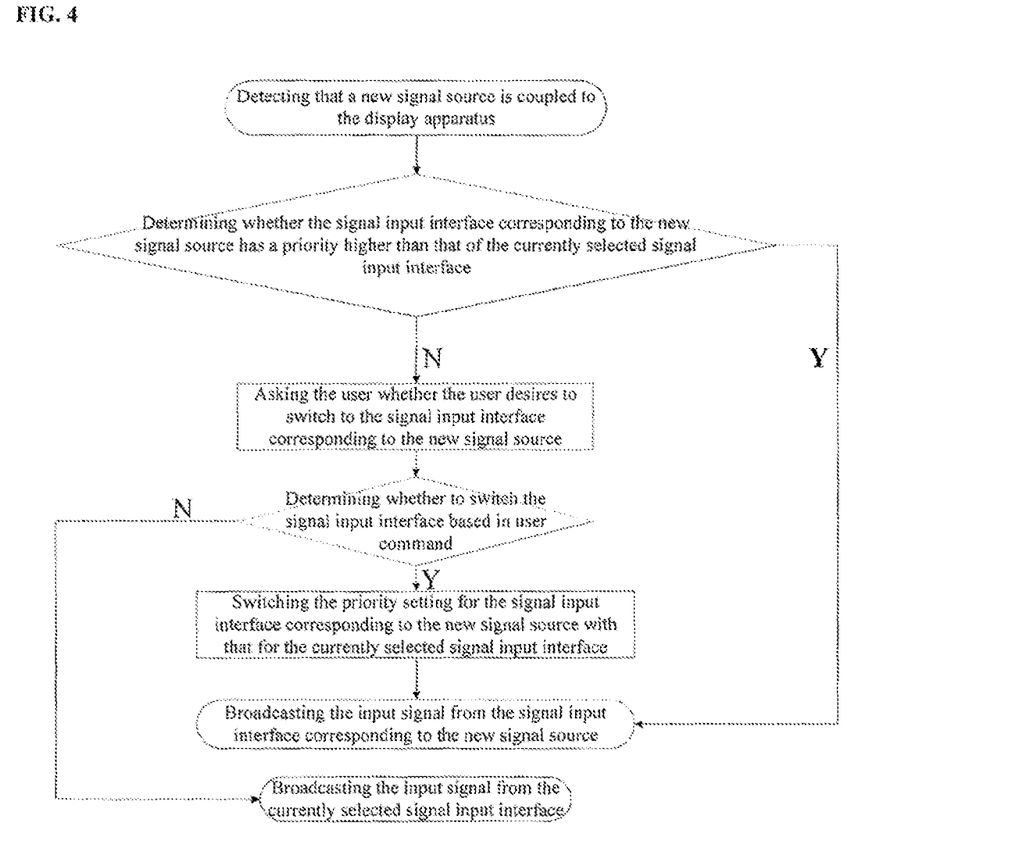
FIG. 4 is a flow chart illustrating a working process of a signal source detection and selection system in some embodiments.

In some embodiments, the input interface scanner continues to scan the rest of the plurality of signal input interfaces in real time, when the display apparatus is broadcasting the processed signal corresponding to the currently selected signal input interface. FIG. 4 is a flow chart illustrating a working process of a signal source detection and selection system in some embodiments. Referring to FIG. 4, when the input interface scanner detects that a new signal source is coupled to the display apparatus, the input interface scanner transmits an input signal from the new signal source to the interface selector, the interface selector determines whether the signal input interface corresponding to the new signal source has a priority higher than that associated with the currently selected signal input interface. Optionally, if the signal input interface corresponding to the new signal source has a priority higher than that associated with the currently selected signal input interface, the interface selector is configured to gate the input signal from the new signal source to the signal processor and in turn to the output terminal for broadcasting. Optionally, if the signal input interface corresponding to the new signal source has a priority lower than that associated with the currently selected signal input interface, the interface selector transmits interface information of the signal input interface corresponding to the new signal source to the SOC module of the display apparatus. The SOC module of the display apparatus sends a request to a monitor requesting user instruction on whether to switch to the signal input interface corresponding to the new signal source. Prompted by the request, the user may input a user command through the input interface. Upon receiving a "Yes" command from the user, the SOC module communicates the command to the priority setter through the I2C bus. The priority setter switches the priority setting associated with the signal input interface corresponding to the new signal source with that associated with the currently selected signal input interface. The signal input interface corresponding to the new signal source is selected for broadcasting on the display apparatus. If the user command is a "No" command, no action is required, and the currently selected signal input interface is kept as the signal input interface for broadcasting.

In some embodiments, the signal source detection and selection system further includes a statistic analyzer configured to collect usage condition information of the plurality signal input interfaces and to generate usage condition statistic based on the usage condition information. Based on the generated usage condition statistic, the priority setter is configured to adjust priority associated with the plurality signal input interfaces in the priority table.

Optionally, the usage condition information includes at least one of an accumulated number of uses in a time period and an accumulated usage duration in the time period. For example, the statistic analyzer may be configured to generate usage condition statistic based on the accumulated number of uses in a time period. Base on the usage condition statistic, the priority setter may be configured to adjust priority associated with the plurality signal input interfaces in the priority table, defining the signal input interface having the highest accumulated number of uses in the time period as the signal input interface having highest priority in the priority table. Optionally, the statistic analyzer may be configured to generate usage condition statistic based on the accumulated usage duration in a time period. Based on the usage condition statistic, the priority setter may be configured to adjust priority associated with the plurality signal input interfaces in the priority table, defining the signal input interface having the longest accumulated usage duration in the time period as the signal input interface having highest priority in the priority table.

Figure 5:
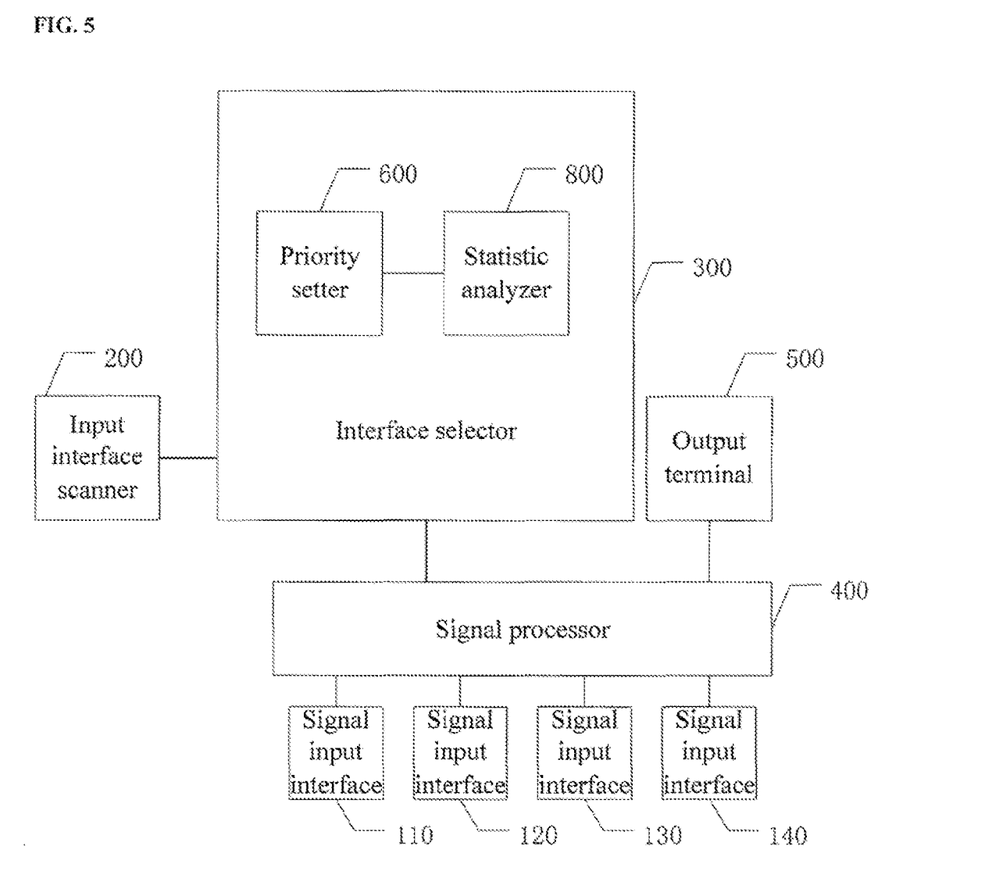
FIG. 5 is a diagram illustrating the structure of a signal source detection and selection system in some embodiments.

FIG. 5 is a diagram illustrating the structure of a signal source detection and selection system in some embodiments. Referring to FIG. 5, the display apparatus has a plurality of signal input interfaces, including a signal input interface 110, a signal input interface 120, a signal input interface 130, and a signal input interface 140. The signal source detection and selection system in the embodiment includes an input interface scanner 200, an interface selector 300, a signal processor 400, and an output terminal 500. The interface selector 300 includes a priority setter 600 and a statistic analyzer 800.

The input interface scanner 200 is configured to scan each of the plurality of signal input interfaces and to determine whether at least two signal input interfaces receive input signals. The interface selector 300 is configured to select a signal input interface having a highest priority according to a priority table out of the at least two signal input interfaces as a selected signal input interface. The priority table ranks the plurality signal input interfaces by priority. The interface selector 300 is further configured to gate an input signal from the selected signal input interface to the signal processor 400. The signal processor 400 is configured to process the input signal from the selected signal input interface to generate a processed signal. The output terminal 500 is configured to output the processed signal to the display apparatus for broadcasting. The priority setter 600 is configured to adjusting priority associated with each of the plurality signal input interfaces in the priority table. The statistic analyzer 800 is configured to collect usage condition information of the plurality signal input interfaces and to generate usage condition statistic based on the usage condition information. The priority setter 600 is configured to adjust priority associated with the plurality signal input interfaces in the priority table based on the usage condition statistic.

In some embodiments, the interface selector further includes a counter, a selector, and a gate. The counter is configured to calculate a total number of signal input interfaces receiving input signals. The selector is configured to select a signal input interface as the selected signal input interface. The gate is configured to gate the input signal from the selected signal input interface to the signal processor.

When only one signal input interface receives input signals (i.e., the total number of signal input interfaces receiving input signals is one), the selector is configured to select the only one signal input interface as the selected signal input interface. When the total number of signal input interfaces receiving input signals are at least two, the selector is configured to select a signal input interface having a highest priority according to a priority table out of the at least two signal input interfaces as the selected signal input interface.

Figure 6:
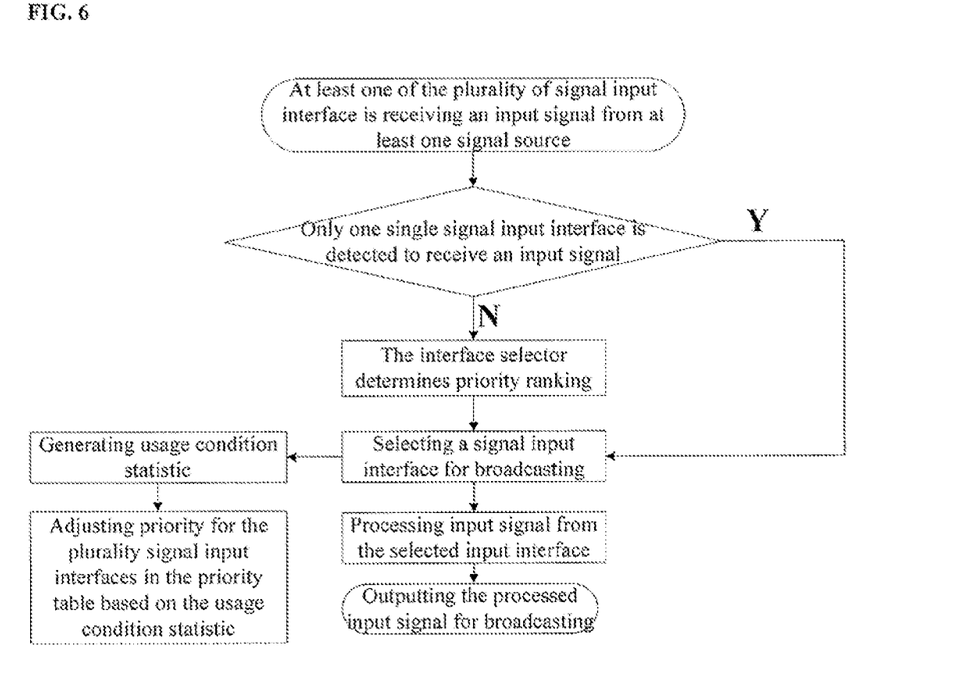
FIG. 6 is a flow chart illustrating a working process of a signal source detection and selection system in some embodiments.

FIG. 6 is a flow chart illustrating a working process of a signal source detection and selection system in some embodiments. Referring to FIG. 6, when at least one of the plurality of signal input interface is receiving an input signal from at least one signal source, the input interface scanner polls each signal input interface of the display apparatus. Optionally, when only one single signal input interface is detected to receive an input signal, the input signal from the single signal input interface is gated from the interface selector to the signal processor. Optionally, when there are at least two signal input interfaces receiving input signals, the interface selector selects a signal input interface having a highest priority according to a priority table out of the at least two signal input interfaces as a selected signal input interface. The input signal from the selected signal input interface is then gated from the interface selector to the signal processor. The signal processor processes the input signal from the selected signal input interface, the processed signal is then outputted through the output terminal to the display apparatus for broadcasting.

Once a signal input interface is selected as the selected signal input interface, the interface selector activates the statistic analyzer to collect usage condition information of the plurality signal input interfaces and to generate usage condition statistic based on the usage condition information. Based on the usage condition statistic, the priority setter is configured to adjust priority associated with the plurality signal input interfaces in the priority table.

In some embodiments, the statistic analyzer 800 includes a timer and a plurality of accumulators, each of the plurality of accumulators corresponding to each of the plurality of signal input interfaces. Each of the plurality of accumulators is configured to accumulate number of uses in a time period. The timer is configured to determine whether the time period has lapsed. When the time period is determined to have lapsed, the timer transmit a signal to the priority setter to adjust the priority associated with the plurality signal input interfaces in the priority table according to the accumulated number of uses of each of the plurality of signal input interfaces in the lapsed time period. Optionally, the time period is 24 hours.

Figure 7:
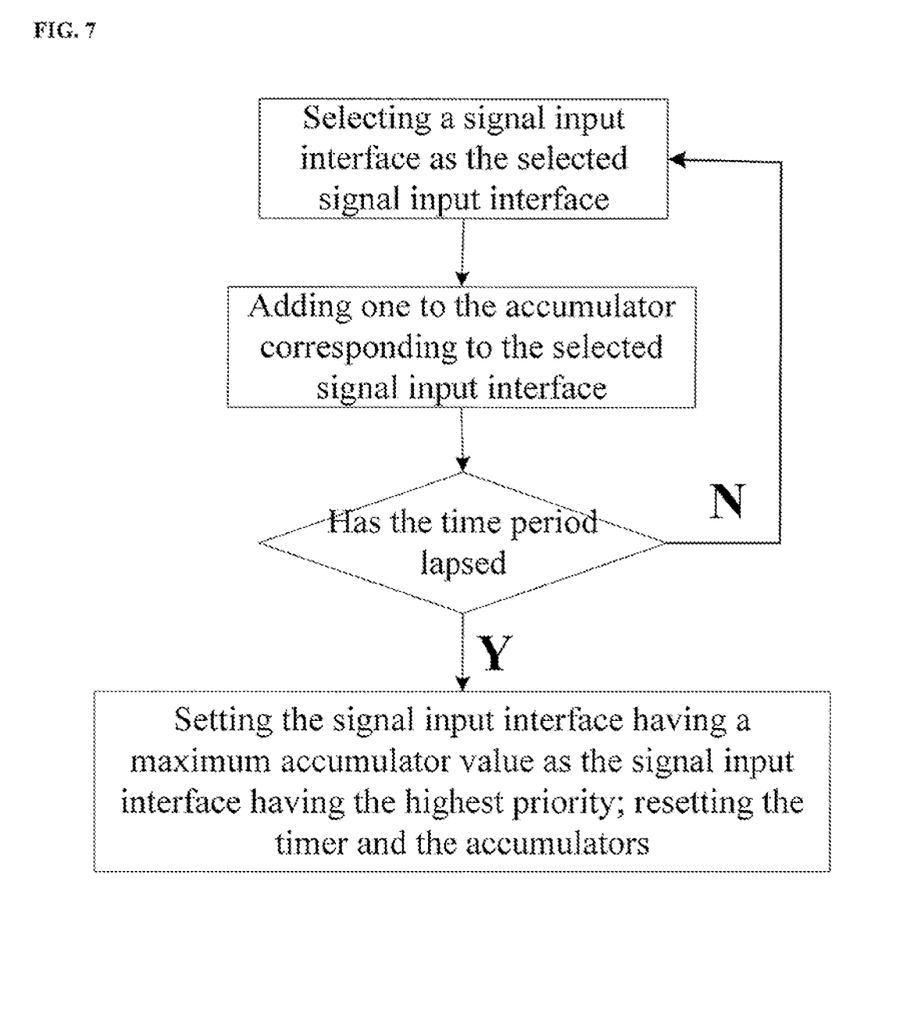
FIG. 7 is a flow chart illustrating a working process of a signal source detection and selection system in some embodiments.

FIG. 7 is a flow chart illustrating a working process of a signal source detection and selection system in some embodiments. Referring to FIG. 7, once a signal input interface is selected as the selected signal input interface, the interface selector adds one to the accumulator corresponding to the selected signal input interface based on interface information of the selected signal input interface. If the time period has lapsed when the operation of the accumulator is complete, the priority setter is activated to set the signal input interface having a maximum accumulator value as the signal input interface having the highest priority. Subsequently, the timer and the accumulators are reset. If the time period has not lapsed when the operation of the accumulator is complete, the priority is not adjusted. By having this design, the most frequently used signal input interface during the time period may be set to be a signal input interface having the highest priority. When the most frequently used signal input interface is used again by the user, the system automatically selects the most frequently used signal input interface as the selected signal input interface for priority broadcasting, without asking the user for command.

The present signal source detection and selection system is a priority broadcasting system that is capable of automatically selecting a signal input interface having a highest priority as the selected signal input interface for priority broadcasting. The present system obviates the need for manually selecting a signal input interface for broadcasting, greatly enhancing convenience and user experience. Moreover, the present signal source detection and selection system has self-learning ability, capable of automatically adjusting priority ranking of the plurality of signal input interfaces to accommodate user preference.

In another aspect, the present disclosure provides a method of detecting and selecting a signal source for a display apparatus having a plurality of signal input interfaces configured to receive a plurality of input signals from a plurality of signal sources. In some embodiments, the method includes scanning each of the plurality of signal input interfaces and determining whether at least one signal input interfaces receives input signals; selecting a signal input interface as a selected signal input interface; processing an input signal from the selected signal input interface to generate a processed signal; and outputting the processed signal. Optionally, when it is determined that at least two signal input interfaces receive input signals, the step of selecting includes selecting a signal input interface having a highest priority according to a priority table out of the at least two signal input interfaces as the selected signal input interface, the priority table ranks the plurality signal input interfaces by priority; processing an input signal from the selected signal input interface to generate a processed signal; and outputting the processed signal.

Optionally, the method further includes adjusting priority associated with the plurality signal input interfaces in the priority table.

Optionally, the method further includes receiving priority adjustment information from a user. Optionally, the step of adjusting priority associated with the plurality signal input interfaces in the priority table includes adjusting priority associated with the plurality signal input interfaces in the priority table upon receiving the priority adjustment information.

Optionally, the method further includes collecting usage condition information of the plurality signal input interfaces and generating usage condition statistic based on the usage condition information. Optionally, the step of adjusting priority associated with the plurality signal input interfaces in the priority table includes adjusting priority associated with the plurality signal input interfaces in the priority table based on the usage condition statistic.

Optionally, the usage condition information includes at least one of an accumulated number of uses in a time period and an accumulated usage duration in the time period.

Optionally, the step of collecting usage condition information of the plurality signal input interfaces and generating usage condition statistic based on the usage condition information includes accumulating a number of uses of each of the plurality of signal input interfaces in the time period. Optionally, the step of adjusting priority associated with the plurality signal input interfaces in the priority table includes, when the time period has lapsed, adjusting the priority associated with the plurality signal input interfaces in the priority table according to the accumulated number of uses of each of the plurality of signal input interfaces in a lapsed time period.

Optionally, the step of processing an input signal from the selected signal input interface to generate a processed signal includes executing a protocol converting process to convert the input signal from the selected signal input interface to a converted signal; and executing a scan format conversion on the converted signal.

In another aspect, the present disclosure provides an electronic system. In some embodiments, the electronic system includes a display apparatus having a plurality of signal input interfaces configured to receive a plurality of input signals from a plurality of signal sources; a memory; and a processor coupled to the memory for executing instructions. Optionally, the instructions include scanning each of the plurality of signal input interfaces and determining whether at least one signal input interfaces receives input signals; selecting a signal input interface as a selected signal input interface; processing an input signal from the selected signal input interface to generate a processed signal; and outputting the processed signal. Optionally, when it is determined that at least two signal input interfaces receive input signals, the instructions include selecting a signal input interface having a highest priority according to a priority table out of the at least two signal input interfaces as a selected signal input interface, the priority table ranks the plurality signal input interfaces by priority; processing an input signal from the selected signal input interface to generate a processed signal; and outputting the processed signal.

Figure 8:
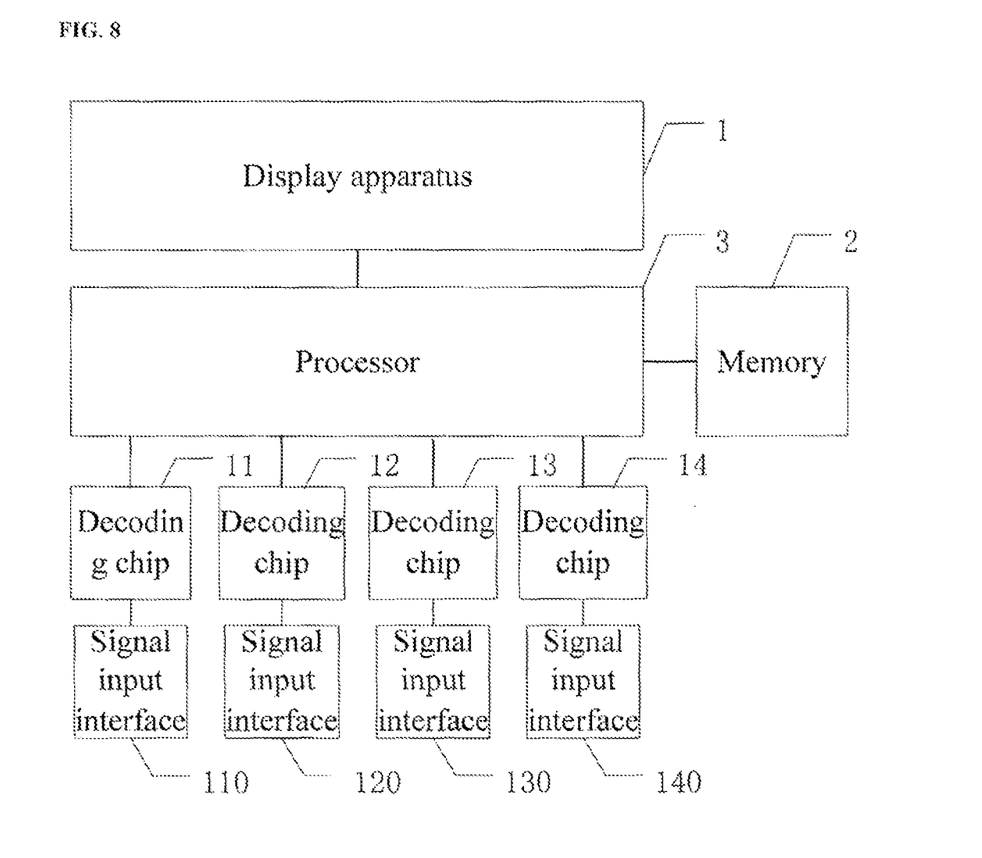
FIG. 8 is a diagram illustrating the structure of an electronic system in some embodiments.

FIG. 8 is a diagram illustrating the structure of an electronic system in some embodiments. Referring to FIG. 8, the processor 3 of the electronic system is configured to be in communication with the SOC module in the display apparatus 1 through an I2C bus. The memory 2 may be a flash memory. When the electronic system is powered up, the data stored in the flash memory is uploaded, various functions of the electronic system may be performed utilizing the uploaded data.

Optionally, the electronic system further includes a plurality of decoding chips, each of the plurality of decoding chips corresponding to each of the plurality of signal input interfaces. Optionally, scanning each of the plurality of signal input interfaces includes scanning a plug signal from each of the plurality of decoding chips corresponding to each of the plurality of signal input interfaces.

Referring to FIG. 8, the signal input interface 110 is connected to the processor 3 through a decoding chip 11, the signal input interface 120 is connected to the processor 3 through a decoding chip 12, the signal input interface 130 is connected to the processor 3 through a decoding chip 13, and the signal input interface 140 is connected to the processor 3 through a decoding chip 14. The processor 3 may determine whether or not a sign input interface is connected to the signal source by scanning a plug signal from the decoding chip corresponding to the signal input interface.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A signal source detection and selection system for detecting and selecting a signal source for a display apparatus having a plurality of signal input interfaces configured to receive a plurality of input signals from a plurality of signal sources, comprising an input interface scanner, an interface selector, a signal processor, and an output terminal;
   wherein the input interface scanner is configured to scan each of the plurality of signal input interfaces and determine whether at least one signal input interfaces receives input signals; the interface selector, coupled to the input interface scanner, is configured to select a signal input interface as a selected signal input interface, and gate an input signal from the selected signal input interface to the signal processor; the signal processor, coupled to the input interface selector, is configured to process the input signal from the selected signal input interface to generate a processed signal; and the output terminal is configured to output the processed signal;
   wherein at least two signal input interfaces receive input signals; the interface selector is configured to select a signal input interface having a highest priority according to a priority table out of the at least two signal input interfaces as the selected signal input interface, the priority table ranking the plurality signal input interfaces by priority; and gate an input signal from the selected signal input interface to the signal processor; and
   wherein the interface selector comprises a priority setter for adjusting priority associated with the plurality signal input interfaces in the priority table.

2. The signal source detection and selection system of claim 1, further comprising an input interface coupled to the priority setter, the input interface being configured to receive a priority adjustment information from a user;
   wherein the priority setter is configured to adjust priority associated with the plurality signal input interfaces in the priority table upon receiving the priority adjustment information from the input interface.

3. The signal source detection and selection system of claim 1, wherein the interface selector further comprises a statistic analyzer configured to collect usage condition information of the plurality signal input interfaces and generate usage condition statistic based on the usage condition information;
   the priority setter is configured to adjust priority associated with the plurality signal input interfaces in the priority table based on the usage condition statistic.

4. The signal source detection and selection system of claim 3, wherein the usage condition information comprises at least one of an accumulated number of uses in a time period and an accumulated usage duration in the time period.

5. The signal source detection and selection system of claim 4, wherein the statistic analyzer comprises a timer and a plurality of accumulators, each of the plurality of accumulators corresponding to each of the plurality of signal input interfaces;
   each of the plurality of accumulators is configured to accumulate a number of uses in the time period;
   the timer is configured to determine whether the time period has lapsed; and transmit a signal to the priority setter when the time period has lapsed to adjust the priority associated with the plurality signal input interfaces in the priority table according to the accumulated number of uses corresponding to each of the plurality of signal input interfaces in a lapsed time period.

6. The signal source detection and selection system of claim 1, wherein the interface selector further comprises a counter, a selector, and a gate; the counter is configured to calculate a total number of signal input interfaces receiving input signals; the selector is configured to select a signal input interface as the selected signal input interface; and the gate is configured to gate the input signal from the selected signal input interface to the signal processor.

7. The signal source detection and selection system of claim 6, when only one signal input interface receives input signals, the selector is configured to select the only one signal input interface as the selected signal input interface.

8. The signal source detection and selection system of claim 6, when the total number of signal input interfaces receiving input signals are at least two, the selector is configured to select a signal input interface having a highest priority according to a priority table out of the at least two signal input interfaces as the selected signal input interface.

9. The signal source detection and selection system of claim 1, wherein the signal processor comprises a first signal sub-processor and a second signal sub-processor;
   the first signal sub-processor is configured to execute a protocol converting process to convert the input signal from the selected signal input interface to a converted signal; and
   the second signal sub-processor is configured to execute a scan format converting process on the converted signal.

10. A method of detecting and selecting a signal source for a display apparatus having a plurality of signal input interfaces configured to receive a plurality of input signals from a plurality of signal sources, comprising scanning each of the plurality of signal input interfaces and determining whether at least one signal input interfaces receives input signals; selecting a signal input interface as a selected signal input interface; processing an input signal from the selected signal input interface to generate a processed signal; and outputting the processed signal to the display apparatus for broadcasting;

wherein at least two signal input interfaces are determined to receive input signals; the step of selecting comprises selecting a signal input interface having a highest priority according to a priority table out of the at least two signal input interfaces as the selected signal input interface, the priority table ranks the plurality signal input interfaces by priority; and wherein the step of selecting further comprises adjusting priority associated with the plurality signal input interfaces in the priority table.

11. The method of claim 10, wherein the step of selecting further comprises receiving priority adjustment information from a user; and the step of adjusting priority associated with the plurality signal input interfaces in the priority table comprises adjusting priority associated with the plurality signal input interfaces in the priority table upon receiving the priority adjustment information.

12. The method of claim 10, wherein the step of selecting further comprises collecting a usage condition information of the plurality signal input interfaces and generating usage condition statistic based on the usage condition information; and the step of adjusting priority associated with the plurality signal input interfaces in the priority table comprises adjusting priority associated with the plurality signal input interfaces in the priority table based on the usage condition statistic.

13. The method of claim 12, wherein the usage condition information comprises at least one of an accumulated number of uses in a time period and an accumulated usage duration in the time period.

14. The method of claim 12, wherein the step of collecting usage condition information of the plurality signal input interfaces and generating usage condition statistic based on the usage condition information comprises accumulating a number of uses of each of the plurality of signal input interfaces in the time period; and the step of adjusting priority associated with the plurality signal input interfaces in the priority table comprises, when the time period has lapsed, adjusting the priority associated with the plurality signal input interfaces in the priority table according to the accumulated number of uses of each of the plurality of signal input interfaces in a lapsed time period.

15. The method of claim 14, further comprising:
adding one to a number of uses of the selected signal input interface in the time period; determining whether the time period has lapsed subsequent to the adding step; and when the time period has lapsed, setting the signal input interface having a maximum accumulator value as the signal input interface having the highest priority; resetting the time period and restarting the accumulating step.

16. The method of claim 10, further comprising:
detecting whether a new signal source is coupled to the display apparatus; determining whether a signal input interface corresponding to the new signal source has a priority higher than that associated with the selected signal input interface; when the signal input interface corresponding to the new signal source has a priority higher than that associated with the currently selected signal input interface; gating the input signal from the new signal source to the signal processor and in turn to the output interface for broadcasting; when the signal input interface corresponding to the new signal source has a priority lower than that associated with the currently selected signal input interface; requesting user instruction on whether to switch to the signal input interface corresponding to the new signal source; and upon receiving user instruction to switch to the signal input interface corresponding to the new signal source, switching the priority setting associated with the signal input interface corresponding to the new signal source with that associated with the selected signal input interface; selecting the signal input interface corresponding to the new signal source for broadcasting on the display apparatus.

17. The method of claim 10, further comprising:
when it is determined that only one signal input interface receives input signals, an input signal from the only one signal input interface is selected as the selected signal input interface; and when it is determined that at least two signal input interfaces receive input signals, selecting a signal input interface having a highest priority according to a priority table out of the at least two signal input interfaces as the selected signal input interface, the priority table ranks the plurality signal input interfaces by priority.

18. The method of claim 10, wherein the step of processing an input signal from the selected signal input interface to generate a processed signal comprises:
executing a protocol converting process to convert the input signal from the selected signal input interface to a converted signal; and
executing a scan format converting process on the converted signal.

19. An electronic system, comprising:
a display apparatus having a plurality of signal input interfaces configured to receive a plurality of input signals from a plurality of signal sources; a memory; and a processor, coupled to the memory, is configured to execute instructions comprising scanning each of the plurality of signal input interfaces and determining whether at least one signal input interfaces receive input signals; selecting a signal input interface as a selected signal input interface; processing an input signal from the selected signal input interface to generate a processed signal; and outputting the processed signal;
wherein selecting the signal input interface comprises selecting a signal input interface having a highest priority according to a priority table out of the at least two signal input interfaces as the selected signal input interface, the priority table ranks the plurality signal input interfaces by priority; and adjusting priority associated with the plurality signal input interfaces in the priority table.

20. The electronic system of claim 19, further comprising a plurality of decoding chips, each of the plurality of decoding chips corresponding to each of the plurality of signal input interfaces;
wherein scanning each of the plurality of signal input interfaces comprises scanning a plug signal from each of the plurality of decoding chips corresponding to each of the plurality of signal input interfaces.

* * * * *

UNITED STATES PATENT AND TRADEMARK OFFICE
CERTIFICATE OF CORRECTION

PATENT NO. : 10,255,877 B2
APPLICATION NO. : 15/528584
DATED : April 9, 2019
INVENTOR(S) : Li et al.

Page 1 of 1

It is certified that error appears in the above-identified patent and that said Letters Patent is hereby corrected as shown below:

On the Title Page

In item (72) Inventors, please correct the third inventor's name to read as follows:
Pablo Navarrete Michelini Signed and Sealed this
Second Day of June, 2020

Andrei Iancu
*Director of the United States Patent and Trademark Office*